United States Patent [19]

Pirooz

[11] 4,365,021

[45] Dec. 21, 1982

[54] LOW TEMPERATURE SEALANT GLASS

[75] Inventor: Perry P. Pirooz, Toledo, Ohio

[73] Assignee: Owens-Illinois, Inc., Toledo, Ohio

[21] Appl. No.: 286,104

[22] Filed: Jul. 22, 1981

[51] Int. Cl.³ .......................... C03C 3/10; C03C 3/08
[52] U.S. Cl. ........................................ 501/15; 501/32
[58] Field of Search ................................... 501/15, 32

[56] References Cited

U.S. PATENT DOCUMENTS

| | | | |
|---|---|---|---|
| 3,250,631 | 5/1966 | Lusher | 65/36 |
| 3,420,683 | 1/1969 | Ikeda | 501/42 |
| 3,650,778 | 3/1972 | Dumesnil | 501/42 |
| 3,703,386 | 11/1972 | Dietz | 501/32 |
| 3,759,727 | 9/1973 | Dietz | 501/18 |
| 3,776,764 | 12/1973 | Takagi et al. | 501/15 |
| 3,778,242 | 12/1973 | Francel et al. | 501/7 |
| 3,787,218 | 1/1974 | Dietz | 501/18 |
| 3,907,535 | 9/1975 | Muller | 501/15 |
| 3,930,093 | 12/1975 | Short | 501/15 |
| 3,947,089 | 3/1976 | Rapp | 501/42 |
| 3,973,975 | 8/1976 | Francel et al. | 501/15 |
| 4,098,611 | 7/1978 | Francel et al. | 501/15 |
| 4,099,977 | 7/1978 | Francel et al. | 501/15 |
| 4,186,023 | 1/1980 | Dumesnil | 501/15 |

FOREIGN PATENT DOCUMENTS

| | | | |
|---|---|---|---|
| 3002353 | 7/1980 | Fed. Rep. of Germany | 501/15 |
| 53-2444 | 1/1978 | Japan | 501/15 |

*Primary Examiner*—Mark Bell
*Attorney, Agent, or Firm*—David R. Birchall; Myron E. Click; David H. Wilson

[57] ABSTRACT

Sealing glass compositions are described which have low sealing temperature requirements and are particularly useful for sealing together the ceramic components used in microelectronic circuitry. The sealing glass compositions are characterized as low temperature, low expansion glasses of high chemical resistance especially against acid attack. Formed of a mixture of a lead borate base glass and beta eucryptite, the sealing glasses of the invention also possess high mechanical and thermal shock strength.

7 Claims, No Drawings

LOW TEMPERATURE SEALANT GLASS

This invention relates to sealing glass compositions, methods of using same and articles produced therefrom. More particularly, this invention relates to sealing glass compositions particularly useful for bonding ceramic components in microelectronic circuitry.

It has long been known that sealing or solder glasses are advantageous means for sealing together pieces of material such as glass, ceramic, metal or the like. Many solder glasses have therefore been developed which have the ability to soften and flow at temperatures significantly below the deformation temperature of the components which they bond so as to cause a minimum of damage during the heat-sealing operation.

The art of forming glass-to-glass, glass-to-metal or glass-to-ceramic seals is fraught with many problems. Among the problems faced in the sealing art is the poor mismatch of the coefficients of thermal expansion of the solder glass sealant with the sealable base glass, metal or ceramic. Another problem is the inability of the sealing glass composition to intimately fuse to the sealable surface at a substantially lower fusible temperature than the deformation or distortion temperature of said sealable substrate whether it be ceramic, glass or metal. Accordingly, it will be appreciated by those versed in the art that a solder glass possessing an effective coefficient of expansion which is essentially equal to the coefficient of expansion of the surfaces to be bonded and suitable for fabricating satisfactory seals represents a valuable contribution to the sealing art.

In sealing various surfaces, it is important to have good stability so as to resist devitrification in the course of sealing or during subsequent treatments of the sealed part. Furthermore, once the substrate has been glazed or sealed, the glass should resist in a satisfactory manner any chemical attack which may result from exposure to the solvent effect of water and other aqueous solutions, particularly those of an acidic nature.

In addition to having good stability, and to assure that a good seal is obtained, it is important that the sealing glasses possess a coefficient of thermal expansion that approximates, as closely as possible, that of the substrate to which it is sealed. If the rates of thermal expansion are significantly different, a satisfactory bond may not be maintained upon cooling the seal when first made and the bond between the glass and substrate, if initially satisfactory, can fail later as a result of temperature fluctuations.

In many instances, the substrate components which the solder glass seals together are often used to encapsulate, or are otherwise connected with, delicate heat-sensitive parts such as electronic equipment, microelectronic circuitry, cathodoluminescent surfaces and the like. To such components any increase in temperature experienced in their environment is detrimental and undesirable. Thus, the use of heat-sealing solder glasses may be, by its very nature, a detriment to the system. This, of course, is also true when heat sensitive components are not present since the factors of time and temperature are also economic in nature. On the other hand, and in many instances, the advantages of using solder glasses over other known sealing techniques so override the detriment of heat-sealing that any such problem is tolerated as a necessary limit upon ultimate quality. It is of course always a desired end result in the development of any new solder glass not only to better its physical characteristics, but also to minimize the time and/or temperature of heat-sealing. Obviously then, the worth of any solder glass may be measured not only by its strength of bond, ability to hermetically seal, reproducibility and the like, but also upon its ability to be heat-sealed at a minimum temperature within a minimum period of time.

Various attempts have been made in the past to provide good sealing compositions. U.S. Pat. No. 3,250,631 to Lusher, discloses a sealing composition which is of the thermally devitrifiable type and reduces the coefficient of expansion of a devitrifiable solder glass without adversely affecting its sealing properties. This patent provides the ability to match a solder glass to particular substrates without detrimentally affecting the properties of the seal or the factors involved in forming the seal. This is generally accomplished by adding to a thermally devitrifiable solder glass, a sufficient amount of an inert refractory material, such as an inert refractory oxide, to lower the thermal coefficient of expansion of the solder glass to the desired, matching value without seriously adversely affecting the sealing temperature, flow characteristics, or other sealing properties of the solder glass. While U.S. Pat. No. 3,250,631 provides the microelectronic art with a significant improvement over known solder glasses theretofore used for ceramic (and especially alumina) component sealing, there was a definite need for improvement. While the techniques of this patent provided seals which worked when formed at temperatures around 425°–450° C. for about one hour or more, the time-temperature factor was still relatively high especially in the microelectronic circuitry art while the ability to consistantly reproduce high quality seals with alumina was relatively low.

U.S. Pat. No. 3,778,242 to Francel et al provides yet another system for sealing wherein a refractory material and a pre-crystallized glass are employed for the production of a crystallizable glass.

In spite of the previous developments, there still exists a need in the art for a new solder glass composition which eliminates and/or reduces some of the problems in the sealing art generally and which is better suited to overcome the particular problems and difficulties that exist in the microelectronic circuitry. The art of sealing microelectronic circuitry within ceramic components has presented special problems, especially with the advent of alumina as a ceramic component. Firstly, these ceramics generally have very low thermal coefficients of expansion (e.g., alumina ceramics vary from about $60-80 \times 10^{-7}$ in/in/°C. at 0°–300° C.). Furthermore, because of the small dimensional limits of the seal and high strength and hermetic properties required, unusually stringent requirements for high strength, reproducibility and hermetic properties are placed upon any solder glass used. In addition, microelectronic circuits are very sensitive to heat, thus the time-temperature factor of heat-sealing presents more than the usual detriment to the system.

This invention provides certain new solder glass compositions which have low sealing temperature requirements, i.e. 420° C. or less, low expansion characteristics, high chemical resistance, and high mechanical and thermal shock strength. These glasses form strong, tightly hermetic, highly reproducible seals and are especially well suited to bond alumina ceramic components in microelectronic circuitry together. It has been surprisingly and quite unexpectedly found that the glasses of the invention are resistant to sulfuric acid even at elevated temperatures. Moreover, it has been found that no surface deposits of sulfate byproducts appears, as is so often the case with conventional glasses, when the sealed packages are subjected to sulfuric acid solutions. The ability to form a highly reproducible, strong hermetically sealed bond between ceramic components especially of the alumina type is particularly significant for the microelectronic circuitry art and the electrical reliability of integrated circuit packages.

In the preparation of encapsulated microelectronic circuits, it is common practice to tin plate the metal leads which come out of the encapsulated alumina package. As a preliminary treatment before plating the package is often subjected to a cleaning or pickling operation by dipping in $H_2SO_4$. In prior art ceramics, the exposed sealing glass has been sensitive to the acid and acid reaction products, usually insoluable sulfate compounds have formed in the exposed sealing glass surfaces. This has caused problems later on because during the plating process, tin has a tendency to deposit on the already deposited sulfate and results in a path for electrical conduction which interfers with or disrupts normal operation of the encapsulated circuit. Because of the resistance to acid attack, the compositions of the present invention avoid this problem.

In one aspect of this invention, there is provided a solder glass composition which comprises a glass matrix of lead borate glass into which the special filler is placed.

In another aspect of the invention, a special beta-eucryptite is employed in finely divided form as a filler for selected lead borate base glasses to produce a vitreous sealing glass which has special properties and characteristics of particular interest for encapsulation of ceramic microelectronic packages.

The base component or glass matrix of the sealing glass of the invention is a lead borate glass matrix, generally also containing one or more other glass components, such as bismuth, zinc, aluminum, silicon, barium, arsenic and tellurium which are normally referred to as being present in their respective oxide forms. Preferred glass matrixes for the purposes of this invention, especially when joining alumina ceramics, are of the lead borate type containing bismuth oxide. Compositions of the base glasses which may be used in accordance with the present invention contain the following ingredients set forth in the following table expressed as oxides based on the total weight of the composition.

TABLE A

| Ingredient | Weight Percent |
|---|---|
| PbO | 78–90 |
| $B_2O_3$ | 8–16 |
| $Bi_2O_3$ | 2–5 |
| $SiO_2$ | 0–1 |
| $Al_2O_3$ | 0–1 |
| ZnO | 0–2 |
| BaO | 0–1 |
| $TeO_2$ | 0–4 |
| $As_2O_5$ | 0–2 |

Other oxides and substances may be present as impurities, depending upon the raw materials used. Such impurities should not be present in amount and kind to adversely effect the glass for purposes of the invention. As will be appreciated by those skilled in glass technology, when working with large batch materials in commercial operations, the amounts of ingredients on an analyzed basis may vary somewhat from those expressed above without departing in an unacceptably large manner from possessing the intended properties and characteristics which make these base glasses particularly suitable for purposes of this invention.

More preferred base glass compositions used in accordance with the present invention are characterized by the following ingredients in the indicated amounts expressed as oxides based on the weight of the total compositions:

| Ingredient | Weight Percent |
|---|---|
| PbO | 81.5–85 |
| $B_2O_3$ | 11–13 |
| $Bi_2O_3$ | 2.5–3.5 |
| $Al_2O_3$ | 0–.5 |
| $SiO_2$ | 0–1 |
| ZnO | 0–1 |
| BaO | 0–1 |
| $TeO_2$ | 0–3 |
| $As_2O_5$ | 0–1 |

The filler used in this invention for mixing with the lead borate glass mixture is an ultra low expansion beta eucryptite; that is, a beta eucryptite with an average lineal coefficient of thermal expansion of $-123\pm5\times10^{-7}$ in/in/°C. (0°–300° C.). This beta eucryptite is produced by a melt process using raw materials selected so as to be primarily high purity oxides. The raw materials do not contain significant amounts of impurities which would cause undesirable results. Typically, the batch ingredients used in making the ultra low expansion beta-eucryptite are lithium carbonate, silica sand and aluminum oxide, added in stoichimetric amounts. These batch ingredients are charged to a suitable melting vessel such as a platinum crucible and are then heated to the melting temperature. The furnace used for the melting process can be an electric or gas fired furnace. The temperature of melting should be about 3000° F. and the melting time period should be about 2 to 4 hours. The melting temperature may range from over 2800° F. up to about 3200° F. Generally, high purity oxides and batch ingredients are used and it has been determined that the ultra low expansion beta-eucryptite produced exhibits extremely low alpha radiation which is particularly important in the electronics industry where higher standards are being set for minimum alpha radiation.

The batch ingredients which are generally as finely ground as is economically feasible are mixed together with care and then are charged to the melting crucible. The melting is carried out in a platinum crucible or other corrosion resistant vessel because the resulting glassy melt is highly corrosive at the melting temperatures of about 3000° F. An atmosphere of air is used in the electric or gas fired furnaces to melt the composition and the pressure is atmospheric. After the melting is carried out for a period of about 2 to 4 hours, the molten glass is carefully discharged from the crucible or vessel in the form of a molten ribbon or stream. At this stage, if it is desired to form the ultra low expansion beta-eucryptite into a shaped article such as a rod or a bar, a casting or molding or other forming operation may be carried out. If it is determined to cast a rod, for example, then care must be taken in the rod forming process to avoid premature crystallization and crystallization of the wrong crystalline phases. It is necessary to avoid thermal shock of the rod in cooling. If cooled too fast, the rod will crack. If cooled too slowly, it will devitrify in an uncontrolled manner producing undesirable crystalline species and sizes. Therefore, it is desirable to preheat the mold in order to keep the rod hot, but not at too high a temperature. Depending on the size of the batch and mold, these temperature conditions will vary somewhat. A long crystallization heat treatment of about 1000° C. for several hours is then carried out to produce the desired beta-eucryptite crystalline phase.

In a method suitable for commercial production the molten, amorphous melt of beta-eucryptite is discharged as a molten stream and is quenched on a roller mill and formed into particles.

The melt is poured out of the crucible in the form of a continuous stream at a rate which is compatible with the efficient operation of the rollers which transforms the molten glass into a thin sheet of about 0.050 of an inch, which sheet is rapidly quenched in cold water. In the process, a rapid quenching takes place in a few seconds from approximately 3000° F. down to about 70° or 80° F.; i.e. in a short time interval. The thin sheet of glass emerging from the roller mill will break up into chips or particles which in turn are heavily crazed because of the rapid quenching. The latter imparts an opaque appearance to the amorphous particles. The rapid quench is essential in this process because, at this stage, the material must remain vitreous to be crystallized is a subsequent stage under controlled conditions. Therefore, it is necessary that the furnace temperature not drop to as low as 2800° F. If the glass drops below 2800° F. during the transfer to the rollers, premature crystallization may occur and it would be necessary to remelt the material.

The particles are removed from the water bath after about 10 minutes. It is important that the particles are not held long enough to react with the water. The particles are then sent to an air dry oven to remove the water. The oven is at a temperature of about 110° to 120° C. The dried particles are then transferred to a high temperature furnace and are heat treated by raising the temperature to approximately 950° C. to 1100° C., preferably 1000° C. over a period of 24 to 48 hours to bring about the controlled crystallization of the material into the desired crystalline phase. The particles may be held in silica, platinum, cordierite or other refractory vessels during the crystallization heat treatment. The container itself is not particularly critical as long as it is refractory and will withstand the high temperature firing steps without interation with the particles. After this period of time, the desired form of the beta-eucryptite is obtained.

The specific weight percents actually employed of each component of the solder glass compositions of this invention will vary over a wide range depending upon the ultimate surroundings of use. In general, a sufficient amount of the ultra low expansion beta-eucryptite should be added to the glass matrix such that together they provide the necessary coefficient of expansion match-up, flow properties, and the like while at the same time provide a strong, tightly hermetic, moisture-resistant seal.

Exemplary of a preferred range of ingredients for most contemplated purposes includes by weight percent: about 8–12% of beta-eucryptite, the balance being lead borate glass. In a more preferred embodiment which represents a modification of the concept in the invention, the range is about 9–11% beta-eucryptite.

The sealing glass compositions of this invention are usually in particulate form and are formulated by blending finely divided particles of the various beta eucryptite and the base solder glass together. For best results, all particles of the constituents should be less than about 100 U.S. Series Sieve screen in size. More preferably, about 50 percent by weight of all particles should be less than about 325 U.S. Series Sieve screen in size but less than 5% by weight smaller than 5 microns. Still more preferably and for best results especially when sealing alumina ceramics, the particles of at least the base lead borate glass and preferably the beta-eucryptite should be reduced such that about 65–70% by weight are smaller than 400 U.S. Series Sieve screen but less than about 3.0% by weight are smaller than 3 microns. Achievement of the necessary particle sizes is obtainable in accordance with well-known fritting and grinding techniques.

The compositions of this invention may be blended in accordance with any conventional technique. However, for best results uniform dispersion of the lead borate glass and the beta-eucryptite should be employed.

The sealing glass compositions of this invention may be applied to the substrates by any conventional technique. Examples of such techniques include spraying, screen-printing, and pyrolyzable tapes. In forming the compositions into sprayable slurries, they are usually dispersed in a liquid organic medium such as alcohol to a sprayable viscosity. Another example of a slurry medium is 1½% nitrocellulose in amyl acetate. Any of the conventional paste organic vehicles may be employed for forming a paste while conventional tapes may also be used.

Once the material is applied, it is dried and/or heated in accordance with conventional techniques to burn off the vehicle and then fired to form the seal. A particularly preferred heat cycle for forming a seal according to this invention comprises a heat up rate of about 50°–100° C./min., a hold as indicated at the peak temperature, and a cooldown rate of about 50°–60° C./min. Such a heat cycle usually insures a high quality seal and a reasonable minimization of weakening stresses being effected during cooling.

The following examples are intended to illustrate rather than limit the invention.

EXAMPLE 1

A base glass is formulated from the following indicated ingredients to yield a lead borate glass containing the components expressed in percent by weight of oxides based on the total ingredients present:

|  | Percent |
| --- | --- |
| PbO | 83. |
| $B_2O_3$ | 12. |
| $Bi_2O_3$ | 3. |
| ZnO | 1.0 |
| $SiO_2$ | 0.5 |
| BaO | 0.5 |

The raw batch ingredients red lead, anhydrous boric acid, bismuth subnitrate, zinc oxide, sand and baria were melted in a platinum crucible at about 1700° F. in an air atmosphere for one and one-half hours. After cooling down, the glass was then fritted and ground to a particle size such that greater than 70% by weight of the particles are less than 400 U.S. Series Sieve screen in size.

This powder was then blended with 11% by weight of the ultra low expansion beta-eucryptite to form the sealing material. The blended composition as well as the glass matrix was subjected to the button flow test as follows. About 10 grams of powder is taken and pressed into a ¾" diameter button which is thereafter heated at various temperatures for 30 minutes. The button flow test is well known in the art and is used as a standard test in the industry for evaluating flow properties.

| Physical Properties of the Base Glass | |
|---|---|
| Button Flow (inches) at 380° C./30 mins. | 1.079 |
| Differential Thermal Analysis-Softening Temp. (°C.) | 345 |
| Gradient Boat Test (30 minutes): | |
| Sintering Edge (°C.) | 335 |
| Crystallization Edge (°C.) | 419 |
| Remelt Edge (°C.) | 444 |
| Physical Properties of the Blend | |
| Filler: Beta Eucryptite (Wt. %) | 11 |
| Button Flow (inches) at - 380° C./30 minutes | 0.803 |
| - 400° C./30 minutes | 1.098 |
| Rod Stress (psi compression in solder glass) vs. A3004 Rod Glass (alpha = 84 × $10^{-7}$): | |
| 380° C./30 minutes | 2450 |
| 400° C./30 minutes | 2050 |

The blend of powders is then formed into a printing paste by admixing it with an organic vehicle consisting of an organic binder and a liquid solvent therefore. These are known materials in the art and any suitable substances may be used for this purpose. The paste consists typically of a weight ratio of 6.5:1 powder to vehicle. The resulting paste is then screen-printed onto a base and cap of alumina using standard techniques and a screen of 80 mesh.

The printed coatings may be heated at a temperature below 300° C. for a short period of time to remove the organic solvent. The printed coatings are then fired at 360° C. for a few minutes to complete the glazing process.

The base portion of the alumina package, which has been glazed, is then provided with conventional metal lead frames. The glazed cap portion of the package is then placed thereover to form a sandwich. The preassembled package is then heated at a rate of 50°–100° C./min. to a peak of 400° C.–420° C. and held for 6–10 minutes to form the seal. The package is then completed by cooling at a rate of up to 60° C./min. to room temperature.

The following table lists compositions which are representative of the lead borate glasses which may be used as the base glass for blending with the ultra low expansion beta-eucryptite to produce the novel sealing glasses of this invention.

TABLE 1

| | 1 | 2 | 3 | 4 | 5 | 6 | 7 | 8 | 9 |
|---|---|---|---|---|---|---|---|---|---|
| PbO | 83.7 | 82.4 | 81.9 | 83.5 | 84 | 84 | 81.5 | 82 | 83 |
| $B_2O_3$ | 12.8 | 12.6 | 12.6 | 12 | 11.5 | 11 | 12.5 | 12.5 | 12.5 |
| $Bi_2O_3$ | 3 | 4 | 4 | 3 | 3 | 3 | 4 | 4 | 3 |
| $Al_2O_3$ | | | | 0.5 | 0.5 | 0.5 | 0.5 | | |
| $SiO_2$ | | | | 0.5 | 0.5 | 1 | 1 | 0.5 | 0.5 |
| ZnO | 0.5 | | 0.5 | 0.5 | 0.5 | 0.5 | | 0.5 | 0.5 |
| BaO | | | | | | | 0.5 | 0.5 | 0.5 |
| $TeO_2$ | | 1 | 1 | | | | | | |
| $As_2O_5$ | | | | | | | | | |

| | 10 | 11 | 12 | 13 | 14 | 15 | 16 | 17 | 18 |
|---|---|---|---|---|---|---|---|---|---|
| PbO | 83 | 83 | 83.2 | 83.0 | 84.1 | 84.1 | 81.5 | 81.93 | 85.83 |
| $B_2O_3$ | 12.5 | 12.5 | 12.4 | 12 | 12.9 | 12.9 | 12.5 | 12.57 | 13.17 |
| $Bi_2O_3$ | 3 | 3 | 3.2 | 3 | | 3 | 4 | 3 | |
| $Al_2O_3$ | | | | | | | | | |
| $SiO_2$ | 0.5 | 1 | 0.5 | 0.5 | | | | | |
| ZnO | | | 0.4 | 1 | | | | 0.5 | |
| BaO | 1 | 0.5 | 0.3 | 0.5 | | | | | |
| $TeO_2$ | | | | | 3 | | 2 | 2 | |
| $As_2O_5$ | | | | | | | | | 1 |

A number of blends were made with the above base glass compositive and the ultra low expansion beta-eucryptite (BE) and the resulting sealing glass compositions were tested for button flow data and rod stress evaluation. The values achieved in these tests indicate that compositions are very desirable which have a button flow of 0.8 or greater at 400° C. for 30 minutes, and a rod stress of at least 1800 psi compression (C) at 400° C. at 30 minutes.

TABLE II

| Sealing Glass Compositions | | | | | | | | | | |
|---|---|---|---|---|---|---|---|---|---|---|
| Base Glass | 1 | 2 | 3 | 3 | 3 | 3 | 3 | 3 | 3 | 3 |
| Amount of BE | 13% | 13% | 13% | 10% | 20% | 15% | 12% | 12% | 12% | 8% | 10% |
| Button Flow | | | | | | | | | | |
| 380°-30 min. | | | 0.812 | 0.874 | | | .797 | .993 | .965 | .921 | .897 |
| 400°-30 min. | 1.047 | 1.082 | 1.175 | 1.153 | 0.845 | 1.009 | | | | |
| Rod Stress | | | | | | | | | | |
| 380°-30 min. | | | | 1802 | cracked | | 2424C | 3335 | 2625 | 1550C | 1869C |
| 400°-30 min. | 2125 | 2410C | 2417C | | | 3094 | 2425 | | 2425 | | |

TABLE III

| Sealing Glass Compositions | | | | | | | |
|---|---|---|---|---|---|---|---|
| Base Glass | 3 | 3 | 3 | 3 | 3 | 3 | 3 |
| Amount of Filler | 10% BE (made with clay) | 11% BE | 37.6 ** | 11.6% * | 5.8% BE + 18.8% | 5.5% BE 5.3% ** | 5.5% BE + 5.8% cordierite |
| Button Flow 380°-30 min. | 0.871 | 0.887 | 0.761 | 0.838 | 0.841 | 0.883 | 0.852 |
| 400°-30 min. | | 1.039 | | 0.896 | | 1.043 | 0.948 |
| Rod Stress 380°-30 min. | 1430C | 2245C | | | | | |
| 400°-30 min. | | 1713C | 557T | 978T | 710T | 1345C | 1001C |

*Ordinary beta eucryptite made by ceramic process
**Lead Titanate

| Base Glass | 3 | 3 | 3 | 9 | 11 | 9 | |
|---|---|---|---|---|---|---|---|
| Amount of | 11.6% | 12% BE | 10% BE | 11% BE | 11% BE | 9.2% BE | |

TABLE III-continued

Sealing Glass Compositions

| Filler | cordierite | | | | | + 9.2% lead titanite |
|---|---|---|---|---|---|---|
| Button flow 380°-30 min. | 0.767 | 0.755 | 0.815 | 0.803 | 0.755 | |
| 400°-30 min. | | | 1.099 | 1.098 | 1.009 | 0.988 |
| Rod Stress 380°-30 min. | | | | 2449C | 2363C | |
| 400° C.-30 min. | 1433T | 2810C | 1850C | 2056C | 2073C | 2623C |

In some applications, stains are desirable for incorporation into sealing glasses as is known in the art. The sealing compositions of the invention also lend themselves to mixing with conventional stains in the usual amounts.

Ceramics sealed with the sealing glasses of this invention enjoy superior acid resistance as mentioned above. To test the capabilities of the compositions of the invention, the following evaluations were carried out. Alumina ceramic parts were glazed with the sealing glasses of the invention using conventional screening and firing procedures. The glazed parts were fired by the same temperature profile that is used in actual sealing of microelectronic packages. The glazed parts were washed and scrubbed in water, rinsed in acetone and dried at 110° C. Individual samples were placed in the acid solution. After the test, the samples were again rinsed, cleaned and dried prior to weighing in order to determine changes in weight. The properties of the new glass of the present invention compared with a commercial glass are shown below.

| | Glass of the Invention | Typical Commercial Glass |
|---|---|---|
| 50% H$_2$SO$_4$/water 95° C. for 1 hr. | 0.88 | 8.6 |
| 50% H$_2$SO$_4$ + 25% HNO$_3$/water 25° C. for 5 min. | 1.50 | 2.37 |
| 40% H$_2$SO$_4$/water 70° C. for 1 hr. | 0.2 | 3.6 |
| 6.3% HNO$_3$/water 25° C. for 5 min. | 58.3 | 78.5 |

In addition to the difference in weight loss exhibited by the packages sealed with the sealing glasses of the present invention, no white residue of insoluble sulfates was exhibited by the sealing glasses of the invention, whereas sulfate deposits were produced by all other glasses similarly tested.

If desired, the properties of the sealing glasses of the present invention may be further modified by replacing a portion of the beta-eucryptite with another filler. Cordierite and lead titanate may therefore be added as secondary fillers. Tertiary fillers may also be added in small amounts to further bring about modifications of the sealing glass of the invention. Thus, such materials as sand and zircon may be added for their expected effect in small amounts, usually not more than 3-4% by weight of the total.

I claim:

1. A sealing glass composition consisting essentially of a vitreous lead borate glass in admixture with a sufficient amount of a crystalline beta eucryptite such that together they provide the desired coefficient of expansion for a strong, tightly heremetic, moisture-resistant seal, said beta eucryptite having an average lineral coefficient of thermal expansion of $-123 \pm 5 \times 10^{-7}$ (0°-300° C.) in/in°C.

2. A sealing glass as defined in claim 1, wherein said beta-eucryptite is crystallized by a rapid quench from a melt of beta-eucryptite produced at about 300° F.

3. A sealing glass composition according to claim 1, wherein said lead borate glass comprises by weight about: 78-90% PbO, 2-5% Bi$_2$O$_3$, 8-16% B$_2$O$_3$, 0-1% SiO$_2$, 0-2.0% ZnO, 0-1% BaO, 0-1 Al$_2$O$_3$, 0-4% TeO$_2$ and 0-2 As$_2$O$_5$.

4. A sealing glass composition as defined in claim 1, wherein the lead borate glass contains the following ingredients in the indicated amounts expressed as oxides based on the weight of the total compositions:

| Ingredient | Weight Percent |
|---|---|
| PbO | 81.5-85 |
| B$_2$O$_3$ | 11-13 |
| Bi$_2$O$_3$ | 2.5-3.5 |
| Al$_2$O$_3$ | 0-.5 |
| SiO$_2$ | 0-1 |
| ZnO | 0-1 |
| BaO | 0-1 |
| TeO$_2$ | 0-3 |
| As$_2$O$_5$ | 0-1 |

5. A sealing glass composition according to claim 1 wherein said lead borate comprises by weight about 83% PbO, 12.0% B$_2$O$_3$, 3% Bi$_2$O$_3$, 0.5% SiO$_2$, 1.0% ZnO and 0.5% BaO.

6. A sealing glass composition according to claim 1, wherein said beta-eucryptite is present in the amount of 8-12% by weight.

7. A sealing glass composition according to claim 1, wherein 60 to 70% of the beta-eucryptite particles will pass through a 400 U.S.

* * * * *

UNITED STATES PATENT AND TRADEMARK OFFICE
CERTIFICATE OF CORRECTION

PATENT NO. : 4,365,021

DATED : December 21, 1982

INVENTOR(S) : Perry P. Pirooz

It is certified that error appears in the above—identified patent and that said Letters Patent are hereby corrected as shown below:

Col. 7, after line 11, insert --The results of the button flow tests are below:--

Col. 10, line 27, "300°F." should be --3000°F.-- (Claim 2)

Signed and Sealed this

Twenty-ninth Day of March 1983

[SEAL]

Attest:

GERALD J. MOSSINGHOFF

Attesting Officer    Commissioner of Patents and Trademarks